Feb. 1, 1966   L. D. MOORE ET AL   3,232,821
FELTED FIBROUS MAT AND APPARATUS FOR MANUFACTURING SAME
Filed Dec. 11, 1964   3 Sheets-Sheet 1

INVENTOR.
Lorenzo D. Moore
John H. Banks
BY
*Kramer + Sturger*

ATTORNEYS

Feb. 1, 1966  L. D. MOORE ET AL  3,232,821
FELTED FIBROUS MAT AND APPARATUS FOR MANUFACTURING SAME
Filed Dec. 11, 1964  3 Sheets-Sheet 2
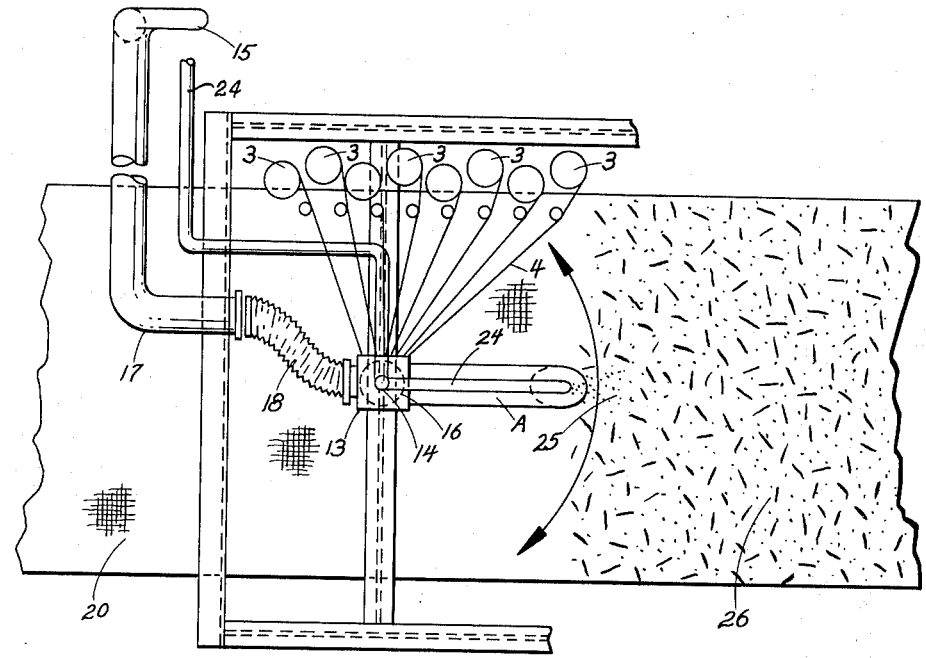
FIG. 2
FIG. 3
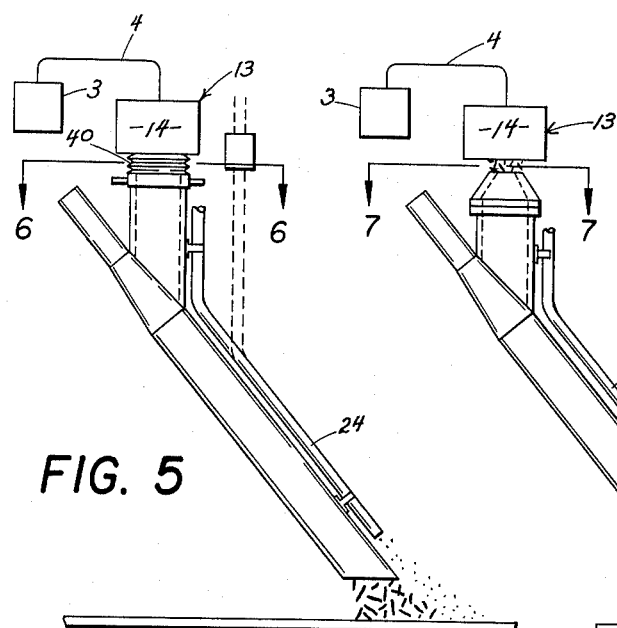
FIG. 5   FIG. 4
INVENTOR.
Lorenzo D. Moore
John H. Banks
BY
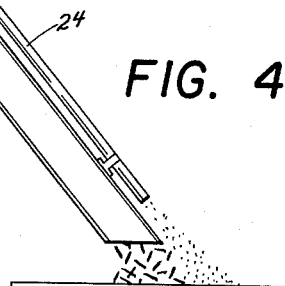
ATTORNEYS Feb. 1, 1966   L. D. MOORE ET AL   3,232,821
FELTED FIBROUS MAT AND APPARATUS FOR MANUFACTURING SAME
Filed Dec. 11, 1964   3 Sheets-Sheet 3

INVENTOR.
Lorenzo D. Moore
BY John H. Banks
Kramer + Sturges
ATTORNEYS

3,232,821
FELTED FIBROUS MAT AND APPARATUS FOR MANUFACTURING SAME
Lorenzo D. Moore, Nashville, Tenn., and John H. Banks, Scarsdale, N.Y., assignors to Ferro Corporation, Cleveland, Ohio
Filed Dec. 11, 1964, Ser. No. 419,281
5 Claims. (Cl. 161—155)

This is a continuation-in-part of co-pending application Ser. No. 35,632, filed June 13, 1960, since abandoned.

This invention relates generally to felted fibrous mats, and more particularly with a felted mat of fibrous material composed of two or more stratified layers of dissimilar texture or composition, and means for producing said mat.

In the manufacture of articles composed of fiberglass reinforced plastic resins, it is frequently desirable to use separate layers of reinforcing fiberglass mat, each of which has different properties from the others. For example, in the manufacture of fiberglass reinforced, plastic corrugated sheet by either an atmospheric pressure curing process, or by matched metal dye molding, a better product will result if its surfaces are rich in resin with a minimum amount of fibrous glass present at the surface. The reason for this is that a dense, resin-rich surface is more impervious to moisture penetration and corrosion. Throughout this specification, the term filament will be used interchangeably with and refer to a single elongated fiber of material. A plurality of fibers in a bundle is called a "strand," and several strands make up what is known in the trade as a roving. It has been found that a relatively thin layer of highly filamented fiberglass mat which readily "wets out," if used for surface reinforcement with resinous materials, will result in an article having dense, resin-rich surfaces. By "highly filamented" we refer to a mat strand composed of hundreds of very fine filaments, which, during processing, has been partially frayed or "filamented" into its fine, component filaments. On the other hand, if such highly filamented mat were used throughout the plastic body, it would not impart the required degree of strength. Hence, the need, in certain applications, for layers of highly filamented mat at the surfaces, and a centrally disposed layer of relatively coarse mat of non-filamented strands for the required strength. The process of making "highly filamented" strands is standard technique known in the art.

In order to achieve a fiberglass reinforced plastic resin article having dense, resin-rich surfaces yet having the required strength imparted by mat composed almost entirely of non-filamented strands, it has been the practice to mold articles using a separate, highly filamented mat, commonly called a surfacing mat or veil mat, for forming one surface of the product to be molded, followed by a reinforcing mat composed almost entirely of non-filamented strands of fiberglass material, after which another highly filamented mat is laid up for providing the opposite, resin-rich surface. The resin is then poured over the preformed mat, and cured. The centrally disposed coarse mat composed almost entirely of non-filamented strands provides the needed strength, while the surfacing mats composed almost entirely of fine, individual filaments, results in the desired, dense, highly resistant, resin-rich surface.

In the manufacture of boats by the matched metal dye process, it is usually desirable to use a highly filamented mat for the surface of the hull which will be exposed to the water so as to achieve a dense, resin-rich surface to minimize water penetration and corrosion. As the interior surface of the hull is not so critical as the exterior, the bulk of the reinforcement for purposes of strength and rigidity can be supplied by a conventional fiberglass mat composed almost entirely of non-filamented strands, and only one dense, resin-rich surface is required necessitating only two dissimilar layers of reinforcing mat.

The use of a separate, highly filamented mat for one or both surfaces, with an interiorly disposed mat of coarse strands, has numerous disadvantages, however, as it requires an extra operation of lay-up in molding and is expensive to use. Furthermore, the use of a separate, highly filamented surfacing mat in conjunction with a coarse, interiorly disposed mat composed almost entirely of non-filamented strands, has points of weakness by virtue of the lamellar relationship between the two or more separate mats used. That is, there is no positive cross linking between the fibers of the highly filamented surfacing mat and the strands of the coarse, centrally disposed reinforcing mat.

This invention overcomes such disadvantages by providing a single, unitary mat of felted fibrous material of stratified cross section, each stratum differing in character, that is in physical texture, and/or chemical composition, from its adjacent stratum, said stratified mat being characterized by interfacial interlacing between the fibers of each strata with the fibers of adjacent strata.

Thus, our stratified mat may be one with each surface composed of a stratum of fine, highly filamented fibrous material between which is disposed a stratum of coarse, non-filamented strands with the fine, highly filamented fibrous material of the surfacing strata projecting into and interlaced with the coarser strands of the center stratum, and with a portion of the coarse strands of the centrally disposed stratum projecting at random directions and angles into, and interlaced with, the fine highly filamented strands of the surfacing strata.

We may also provide a mat of two strata, one coarse, one fine, where only one, resin-rich surface is required as in the manufacture of boats. Again, there will be interfacial interlacing between the coarse and fine layers to provide added strength in handling, and in the finished, fiberglass reinforced plastic product.

When it is desirable to build high strength into a reinforced plastic laminate with a minimum fiber content, and surface density is not a requirement, the result is achieved by reversing the above procedure and putting the coarse strands on the outside surfaces with a filamented core. We may thus produce a high modulus mat. That is, the laminate produced therefrom will have a high modulus in that it will be stiffer for the same glass content than that made from standard uniformly filamented mat. This effect might be compared with an I beam with the flanges and web being compared respectively to the coarse strand surface and the filamented core. A working example of high modulus mat is illustrated in Table I infra.

While it is true that a stratified mat composed of felted, fibrous materials could be produced by manufacturing the individual strata independently of each other, followed by lamination of the individually produced strata, such method involves several disadvantages. Where the strata are composed of fibrous glass materials, and are produced individually, they must be bound together by some type of resin binder which involves a separate curing process for each stratum. Furthermore, such procedure requires three separate pieces of felting equipment, or in the alternative, necessitates time consuming and expensive change-overs where a single piece of equipment is used to individually produce two or more separate mats for subsequent lamination into a single stratified mat. Furthermore, lamination of individually produced mats cannot achieve the desired degree of interfacial interlacing between strata for added strength in handling and processing.

Briefly stated, our novel stratified mat is produced by incorporating into one apparatus for the continuous manufacture of felted fibrous material, two or more substantially straight, rigid, unitary hollow chutes arranged in tandem, depending upon the number of strata desired, each of which chutes deposits its individual, fluid-entrained chopped fibers onto a moving, continuous conveyor to form a mat of stratified cross section, each stratum differing in character, e.g. texture and/or composition from its adjacent stratum, said strata being formed as the result of each deposition of fluid entrained fibers consisting of chopped fibers of a different texture and coarseness and/or different composition from the immediately preceding or following deposition, each consecutive deposition of chopped fibers immediately following, and superimposed upon, with attendant interfacial interlacing, the preceding deposition.

Such an arrangement permits, for example, ready manufacture, from one apparatus utilizing a single, moving, continuous conveyor, a mat of felted, fibrous material in which both surfaces are composed of a fine, highly filamented fibrous material, while the core, or inner layer, is composed of a fibrous material of different character, e.g. coarse fibrous material, separate and distinct from the outer layers, yet firmly interlaced with them at the strata interface. This is achieved by feeding fine, fibrous material into an initial depositing chute, which lays such fine fibrous material directly on the moving, continuous conveyor. As this initial layer of fine material passes under a second chute, said second chute propels a layer of coarse, fibrous material onto the first layer of fine material. A third chute may be arranged to blow a final layer of fine, fibrous material over the centrally deposited coarse layer, resulting in a mat of felted, fibrous material, having highly desirable fine surface characteristics, yet having an interiorly disposed coarse layer of superior structural strength. A resin binder such as, a polyester, may be distributed with each layer of fibers, as described in more detail later, which binder is later cured to give the resultant mat greater strength in handling. Through impingement of subsequently deposited fibers onto and partially into the still loose, somewhat fluffy layers previously deposited, a very desirable degree of interlacing is achieved at the strata interfaces, which could not be realized by producing strata separately and later recombining them. When desirable, more than three chutes may be utilized to provide a mat consisting of more than three dissimilar strata, or to improve the efficiency and speed of the mat machine producing a mat of uniform cross section. Conversely, when a mat of only two dissimilar strata is desired, our invention contemplates that all, or any lesser number of installed chutes may be used, each being controllable independently of the others.

It is a principal object of this invention to provide a stratified or laminar mat of felted, fibrous material comprising two or more strata dissimilar in character, e.g. chemical and/or physical, wherein the strata are interlaced with each other at their interfaces.

Another object of this invention is to provide a process for quickly and efficiently manufacturing a mat composed of felted, fibrous materials.

Another object of this invention is to provide an apparatus for producing, on an integrated basis, a stratified mat of felted, fibrous material, composed of two or more dissimilar strata, wherein the strata are interlaced with each other at their interfaces.

It is still another object of this invention to provide an article of manufacture comprising a resin laminate reinforced by a felted fibrous mat of alternating, dissimilar strata, characterized by physical interlacing at the strata interfaces.

Where reference is made herein to "dissimilar strata," it is meant that the fibrous layers or lamina in question differ from each other in character, physically, chemically, or both. Physical dissimilarity contemplates variation in the physical properties of fibers of the same chemical composition, e.g. glass, hemp, or sisal, such as degree of fraying, coarseness, length of fiber, etc. Chemical dissimilarity contemplates variation in the chemical properties of fibers of the same physical structure, e.g. glass fibers compared with hemp fibers of the same physical dimension. Physical and chemical dissimilarity contemplates both physical and chemical variations as between fibers in respective strata. In the preferred embodiment of this invention, we are primarily concerned with fiberglass strand strata differing primarily in the degree of filamentation of each.

In the annexed drawings, then, which illustrate the invention, but are not to be considered in any way a limitation upon the various ramifications and variations which may be made in the invention without departing from its basic tenor, FIGURE 1 is a side elevation view of one form of apparatus embodying the principles for producing the articles of manufacture of our invention;

FIGURE 2 is a plan view of the apparatus illustrated in FIGURE 1;

FIGURE 3 is a cross sectional fragmentary view of the novel article of manufacture produced by this invention;

FIGURE 4 is an enlarged elevation view of one of the chutes in FIGURE 1 in greater detail;

FIGURE 5 is an enlarged elevation view of another variation of a chute utilizing an oscillating mechanism in a vertical plane;

Figure 1:
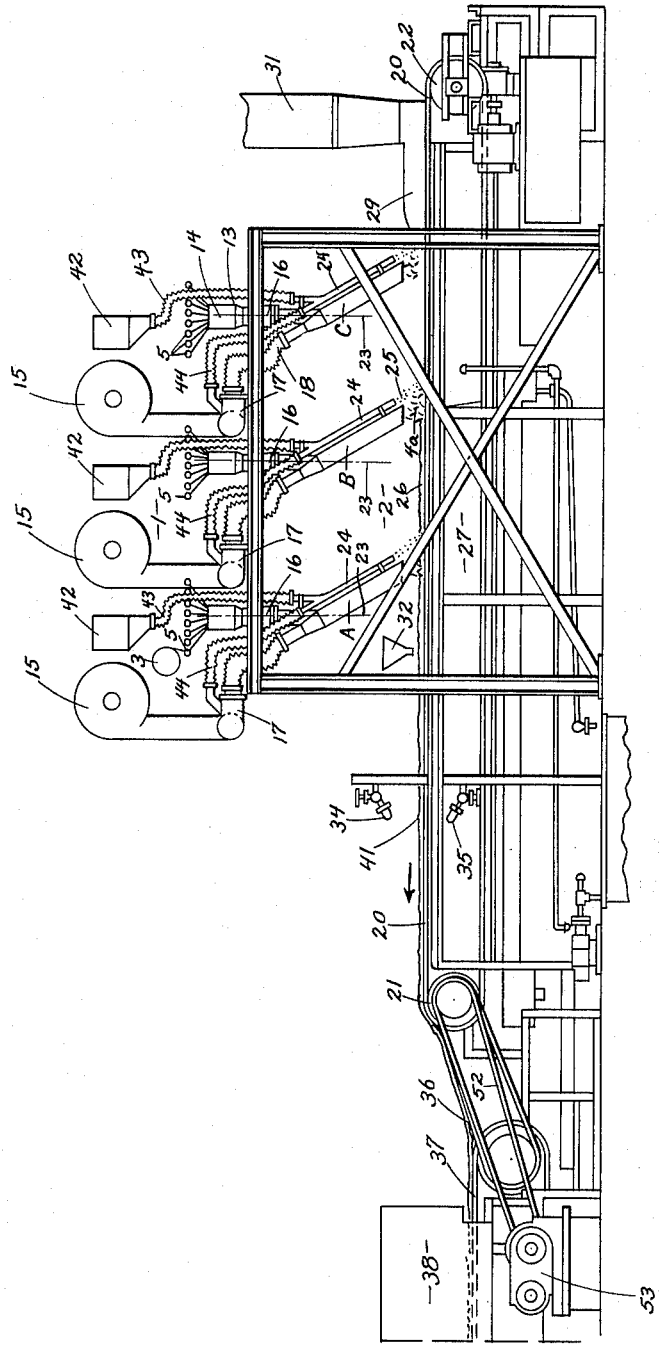

Referring now more specifically to the drawing, and particularly to FIGURE 1, the appaartus depicted may be considered as divisible into two main subsections, namely, a strand supply and chopping section indicated generally by 1, and a mat forming section indicated generally at 2.

Figure 9:
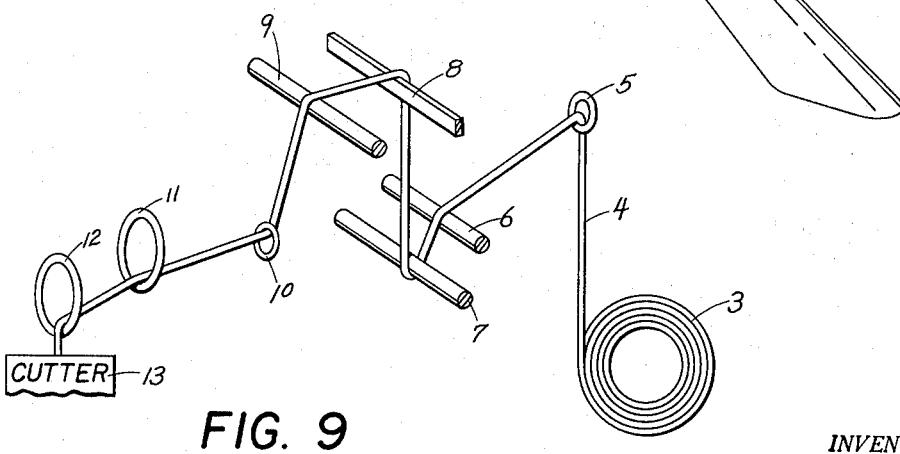
FIGURE 9 is a diagrammatic representation of the manner in which an individual strand or roving may be withdrawn continuously from the ball in which it is received, and fed into the cutting apparatus for chopping into short lengths prior to being fed into the machine illustrated in the preceding figures.

As described above, the apparatus and method involve a continuous supply of strand in the form of strand balls indicated generally at 3 in FIGURES 1, 2 and 9, from which a continuous strand or roving generally indicated by 4 is withdrawn through a guide eye 5 and then preferably over a plurality of bars or rods 6, 7, 8, and 9, shown in diagrammatic detail in FIGURE 9, which are so arranged relative to each other and the path of movement of the strand that the latter is caused to be flexed in opposite directions to break up the unity thereof so that as the strand is then finally chopped into short lengths there will be a greater possibility for the formation of at least substantial amounts of monofilaments as the chopped mass is fed on to the moving foraminous conveyor 20, where it forms a felted mat. When nonfilament chopped strand of high integrity is desired, the breaker bars may be by-passed.

The thus flexed strand passes through eyes 10, 11, 12, shown in diagrammatic detail in FIGURE 9, into a cutting zone generally indicated at 13. Any suitable type of cutting apparatus may be used although for most purposes it is preferred to use contacting co-acting rollers with resilient surfaces, one of which rollers has cutting knives so arranged in its periphery that the rollers may simultaneously draw or attenuate strand from a suitable supply and sever said strand into the desired lengths. However, any other suitable means may be used to deliver chopped strands to the mat forming section 2, such as described in U.S. Patent No. 2,860,687.

At this point it should be noted that in the preferred embodiment we utilize chopped strand for the facing stratum which has been broken up sufficiently so that after being ejected by the cutting or chopping machine a substantial proportion, if not all, of the body of the filamented facing layer is made up of monofilaments instead of groups of undisintegrated strands, although the presence of some strands which have not been reduced to monofilament sub-division can be tolerated. As stated above, the breaker arms 6, 7, 8 and 9 can be bypassed in producing the coarse center layer which is predominantly of chopped strands rather than monofilaments.

The apparatus illustrated in the drawings has been utilized in the commercial production of mat ranging in width of from 30 inches to 60 inches. In order to produce a mat of such width which weighs, for example, from 0.3 to 6 ounces per square foot and with the conveyor on which the mat is formed traveling at a speed of about 10 to 50 feet per minute, 1 to 12 separate rovings, consisting of a multiplicity of strands, in this case, 60, are chopped simultaneously and fed to each chute in order to produce a two ounce mat. Thus, as for example, illustrated in FIGURES 1 and 2, we have indicated at 14, chopping machines which simultaneously draw and chop eight rovings.

From the cutters 14, the chopped roving is induced to flow downwardly by gravity through the hollow bearings indicated by 16. As the strands are not firmly bound together in a roving, said roving quick disintegrates into strand after cutting, and further into filaments when breaker arms are used as described above. This flow is aided by the aspiratory effect of a current of air from the blowers 15, which is directed through the ducts 17, flexible hoses 18 and finally through the hollow chutes A, B, and C, wherein the air current entrains the chopped fibers dropping downwardly through the hollow bearing 16 and expels them in a cascade on to the web or conveyor on which the mat 26 is formed and which is most clearly indicated by 20 in FIGURES 1 and 2, being trained about faced pulleys 21 and 22, the former being driven as by means of a belt 52 from a prime mover 53. It will be noted that the point of entry of air into said chutes is separate and distinct from the point of entry of strand thereinto.

There is mounted on and parallel with each chute A, B, and C, tubes 24 for distributing powdered resin binder 25 along with the chopped strands 4a, onto the moving conveyor 20. The powdered resin is continually supplied by gravity from a suitable source 42. Indicated at 43 is a flexible hose for feeding resin to the tube 24, which permits rotation of the resin tube 24 about vertical axis 23. Another flexible hose 44 provides air from the blower 15 to aid distribution of the resin binder through the tube 24.

Thus, the hollow bearing 16, in addition to forming a means for the downward passage of chopped fibers from the cutter 14, permits any one of the chutes A, B, or C and resin tubes 24, to be oscillated generally about a fixed axis in an arc whose chord is transverse to the direction of movement of support 20, by any number of well known suitable means, not shown, in such a manner that the fluid entrained chopped strands or fibers 4a, along with powdered resin 25, are evenly and uniformly distributed on to the moving conveyor 20. In the preferred embodiment shown, the axis of the chutes A, B, and C form an angle of about 45° with the horizontal, although satisfactory results may be obtained anywhere from between about 90° to about 20° with the horizontal.

In FIGURE 9, in the preferred embodiment illustrated, strand is pulled through breaker bars 6, 7, 8, and 9 by the cutter 14 and thence dropped into a chute A via hollow bearing 16, as shown in FIG. 1 thus discharging highly filamented chopped strand, in like manner chute B is discharging coarse, non-filamented roving, due to the breaker bars 6, 7, 8 and 9 being by-passed as described above, while chute C is laying down the same highly filamented material as chute A. As shown, the resultant stratified, interfacially interlaced mat characterized by a disposition of fibers in each stratum at random directions for interlacing co-action with fibers of adjacent strata, indicated by 26 in FIGURE 1 and shown in greater detailed cross section in FIGURE 3, is thus laid down on the moving foraminous conveyor 20, interspersed with powdered resin binder.

In order to further increase the felting of the mat in the early stages of its formation, the web or conveyor 20 passes over a suction box generally indicated at 27 which is arranged in the area directly below the area within which the glass is deposited on the foraminous web 20. The lateral configuration of the suction box 27 is preferably substantially the same as the lateral extent of the moving foraminous conveyor 20.

The lateral extent of the suction box 27 is difficult to show on the drawings because of the presence of the other equipment. However, by having reference to FIGURES 1 and 2 the meets and bounds of the lateral walls of the suction box are conveniently the marginal edges of the conveyor belt 20 and the horizontal span of the belt 20 adjacent the pulleys 21 and 22. Individual suction boxes under portions of the belt may be provided if desired. Sub-atmospheric pressure in the suction box 27 is provided by any suitable means, not shown completely, such as suction fan generally indicated at 29 and the exhausted air sent upwardly through a stack 31.

As indicated, the moving foraminous conveyor 20 trained about pulleys 21 and 22 moves from right to left in its upper run in FIGURES 1 and 2 at a speed of approximately 10 to 50 feet per minute and in this way the preliminary felted stratified glass mat formed over the suction box 27 is carried to the left for a series of further treatments. The first of these treatments is the application thereto of additional bonding material which may be applied through the trough 32 which extends transversely of the machine and has its discharge slot along the bottom closely adjacent the top of the mat. This is done so that the mat comprises about 3% to 10% resin per 100% of chopped fibers. Suitable means such as a screw conveyor, not shown, or the like may be used for the purpose of feeding to the trough 32 the bonding material which, as previously indicated, may be in the form of a dry resin. If, of course, a different type of bonding material such as a liquid were to be used, correspondingly different feed means would need to be employed.

The thus formed and preliminarily felted stratified mat continues moving to the left on the upper run of the conveyor web 20 until it reaches the area generally indicated at 41 where the mat is sprayed from opposite sides through a series of nozzles 34 and 35 with a suitable liquid for which purpose water is quite satisfactory. The effect of this liquid application is to further densify or compact the mat, so that better bond is obtained between the felted stratified fibers during the curing process in the oven. Attention is directed to the fact that if desired instead of spraying water through fog nozzles 34 and 35 water emulsions of various resins may be used.

The conveyor 20 discharges the thus formed mat on to an auxiliary conveyor 36 which in turn discharges on to a treating conveyor 37, the latter being preferably formed of metal and foraminous in character and which carries the mat into the feed end of a curing oven generally indicated at 38 within which the mat is subjected to a temperature such as to fix the resin and thoroughly bond the mat. The water which had been introduced to the mat at nozzles 34 and 35 is, of course, evaporated also in the oven 38.

Figure 7:
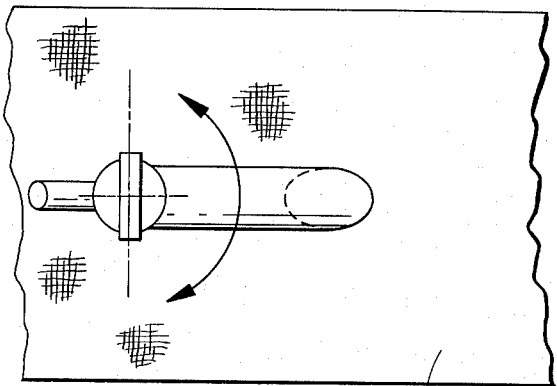
FIGURE 7 is a plan view of the chute shown in FIGURE 4.
Figure 8:
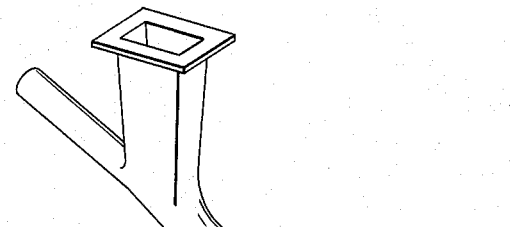
FIGURE 8 is a perspective view of a flared chute which may be used.

FIGURE 7 shows the arc of oscillation of any one of the chutes illustrated in FIGURES 1 and 2 and shown in the enlarged elevational view in FIGURE 4. FIGURE 7 is taken through the section 7—7 in FIGURE 4.

Figure 6:
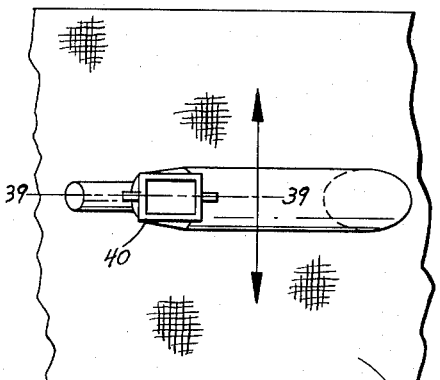
FIGURE 6 is a plan view of the chute shown in FIGURE 5.

FIGURE 6, illustrating a variation in oscillating means, shows a deposit chute rotatable about the horizontal axis 39, said view being taken along the section 6—6 in FIGURE 5. Oscillation in a vertical plane may be achieved by any suitable means not shown. A flexible duct 40 permits passage of chopped fibers downwardly to the deposition chute from the cutter 14.

While we prefer to run the conveyor from right to left as shown, it is immaterial in which direction it is run with respect to the slope of the chutes A, B, and C, so long as the processing equipment for spraying, curing the resin binder, etc., is arranged in its proper consecutive order as described above.

Chutes A, B, and C, or for that matter, any additional chutes which may be incorporated, are capable of operation independent of the others so far as rate and type of deposition from any one chute is concerned. For example, we may produce a mat of three strata, the top and bottom layers of which consists of extremely fine, highly filamented chopped fibers in layers weighing 0.1 to 0.7 ounce per square foot of glass in the finished stratified mat, with the center chute B, laying down an intermediate stratum of coarse, fibrous sisal or other organic fiber, appreciably thicker than the facing layers, weighing .7 to 5 ounces per square foot of finished mat. A fourth chute, D, not shown, but like chutes A, B and C may be added if additional layers are desired. By varying the rate of feed of fibers to each chute, we may also vary the relative thickness of each stratum.

Applicants have discovered that if all the strands near the surface of a plastic resin article, are extremely highly filamented, i.e., the strands frayed in such a manner that the binder is broken to thereby release either the individual monofilaments or tufts of them resulting from fraying, the resin of the finished article is able to much more thoroughly and completely penetrate and literally soak the frayed strands to thereby provide a relatively dense, resin-rich surface which is highly resistant to chemical and atmosphere attack.

The reason for this apparently being that, the relatively dense, resin-rich surface prevents "wicking" which occurs if totally unfilamented strands are present at the surface, which reduce wetting by the plastic resin of the article to be manufactured thereby, creating tiny surface areas whereat an individual strand, or portion thereof, forms part of the surface of the finished article with little or no resin impregnation at that point, thereby creating a point conducive to the penetration of moisture.

That is, the exposed (non-filamented) strand itself literally acts as a wick to absorb chemicals and moisture to the detriment of the entire laminate. If that same strand at the surface were *frayed* into a major portion of its individual monofilaments, or smaller bundles of monofilaments of possibly 10 to 30 or 40 monofilaments, there would then be presented at the surface of the reinforced article strand in such a form as permits ready and easy soaking and penetration thereof by resin, to form a dense surface and thereby obviate the difficulties encountered with *un*filamented strand at the surface.

However, it has also been found that fraying of said strand causes a substantial loss in reinforcing strength, thus the reason for conceiving a laminar interlocking mat structure which would have highly filamented strand at the surface to provide a resin-rich surface of the finished article, with *un*filamented strands in the center to provide the necessary strength.

It must also be borne in mind that a "highly filamented," or frayed strand does not necessarily mean that the integrity of the chopped strand has been completely disrupted over its entire length. It may or may not be, as those skilled in the art will appreciate, hence it is impossible to be highly definitive by stating that there are *only* monofilaments or *only* strands in any given layer. However it is believed that the term "highly filamented" will have a specific meaning to those skilled in the art, and that "predominantly" adequately describes the nature of a layer as being filamented or non-filamented; it is believed this terminology properly describes the character of applicants' novel stratified mat.

The strands of all of the strata of applicants' mat were substantially the same prior to fraying and filamenting the surface layers.

That is, the monofilaments which go to make up the strand of any given layer are all substantially of the same diameter. As is well known to those skilled in the reinforcement field, the strength of a reinforcement is dependent to a great extent on absolute uniformity of the diameter of the filaments used in a plastic reinforcing mat. Great care, and much time and money is spent on elaborate controls of bushing temperatures and attenuating speeds to insure the closest possible uniformity between all the filaments present in a reinforcing mat.

Referring to Table 1, there is illustrated the various types of stratified mat which may be produced with the apparatus described, including the high modulus mat described above, the ounces per square foot being adjusted by the amount of fibrous material fed to each individual chute per unit time, at a constant conveyor speed.

Table 1

| Chute | Boat Mat, *Oz./ft.² | Boat Mat, Oz./ft.² | Corrugated Sheet Mat, Oz./ft.² | High Modulus Mat, Oz./ft.² | High Strength Mat, Cheap Core, Oz./ft.² |
|---|---|---|---|---|---|
| A | 0.1 MF | 0.3 MF | 0.2 MF | 0.6 HSI | 0.5 HSI |
| B | 1.9 HSI | 1.2 HSI | 1.6 HSI | 1.3 MF | 0.5 S |
| C | | | 2.2 MF | 0.6 HSI | 0.5 J |
| D | | | | | 0.5 HSI |
| Total Oz./ft.² | 2.0 | 1.5 | 4.0 | 2.5 | 2.0 |

MF=Predominantly monofilaments; HSI=High strand integrity or minimum monofilaments; J=Jute; S=Sisal.
*Ounces.

While the apparatus described is to be preferred for manufacturing our novel mat, it would be possible to distribute the various strata on to a moving conveyor by other means, such as by hand, for example, or by a series of dispersal web conveyors arranged to consecutively drop fibers of dissimilar texture on to a moving mat conveyor and thus form a stratified mat of sorts. However, we believe our novel apparatus incorporates a variety of features which make for the more efficient and uniform manufacture of fibrous felted mat of stratified cross section.

Referring to FIGS. 1, 4, 5 and 8, we have found that a deposition chute having an annular Venturi constriction between the point of entry of air and that of the chopped fibers or roving from the hollow bearing 16, tends to have more favorable distribution qualities by virtue of the annular Venturi constriction reducing turbulence within the chute and consequently minimizing undesirable agglomeration of the fluid entrained fibers during deposition. The chute depicted in FIG. 8 may be substituted for any one, or all, the chutes of regular cross section depicted in FIGURES 1 and 2.

One feature of our apparatus which we consider highly novel and conducive of efficient operation, is the chute design whereby the strand is introduced into a chute at one point and the air at another, thus minimizing any clogging tendencies and consequential restriction in the smooth flow of fibers. That is, we have found that air delivery of strand to a chute, as disclosed by Fox in U.S. Patent No. 3,081,207, renders an even and uniform flow of fibers impossible, which is so vital in the field of reinforcement.

Having thus described our invention in detail, we claim:

1. An integral felted fibrous mat comprising:
   (1) a first layer portion weighing about 1/10 to about 9/10 ounce per square foot and having a plurality of chopped glass strands, said strands consisting of a multiplicity of monofilaments, which strands in said first layer portion have been intentionally frayed at their extremities into a number of their composite monofilaments, and a resin binder for such strands,
   (2) a second layer portion weighing about 7/10 to about 5 ounces per square foot comprising a plurality of high strength glass fiber strands consisting of a multiplicity of monofilaments generally linearly arranged with respect to each other, said strands in said second layer portion in substantially non-frayed form as compared to the strands of said first layer portion, and a binder for said high strength strands, and
   (3) a third layer portion weighing about 1/10 to about 9/10 ounce per square foot of frayed strands substantially similar to those of said first layer portion, and a resin binder therefor, each of said first and third layer portions bonded to opposite surfaces of said second layer portion aided by an interfacial relationship formed by an interlacing relationship of the frayed strands of said first and third layers with the substantially non-frayed high strength strands of said second layer, each of said first and third layer portions adapted for forming an article in which each of said portions by virtue of their frayed characteristic are adapted to absorb a high degree of resin to form a resin-rich surface therewith opposite its interfacial bonding surface with said second layer portion, said second layer portion being thicker and heavier per unit area than said first and third layer portions.

2. A felted fiber mat suitable for use as a boat mat and the like comprising:
   (1) a first layer portion weighing about 0.1 to about 0.3 ounce per square foot comprising a plurality of fine chopped fiberglass strands, said strands consisting of a multiplicity of monofilaments, which strands in said first layer portion have been intentionally frayed at their extremities into a number of their composite monofilaments, and a resin binder for said strands, and
   (2) a second layer portion weighing about 1.2 to about 1.9 ounces per square foot comprising a plurality of substantially non-frayed strands, said strands consisting of a multiplicity of monofilaments generally linearly arranged with respect to each other, and a binder for said strands, said first and second layer portions disposed in a snug contacting relationship characterized by an interlacing of the frayed monofilaments of said first layer portion with the strands of said second layer portion to thereby form an interfacial bonding relationship therebetween, said second layer portion being thicker and heavier per unit area than said first layer portion.

3. A felted, fibrous high modulus mat comprising an upper layer weighing from about 0.1 to 0.6 ounce per square foot comprising a plurality of glass strands, said strands consisting of a multiplicity of monofilaments in substantially non-frayed, close knit linear relationship, and a resin binder for said strands, a middle layer weighing about 1.3 ounces per square foot and comprising a plurality of chopped glass strands, said strands consisting of a multiplicity of monofilaments, which strands in said middle layer portion are frayed at their extremities into composite monofilaments, and a resin binder for said strands, and a lower layer weighing from about 0.1 to about 0.6 ounce per square foot comprising glass strands in which each strand is composed of a plurality of monofilaments residing in linear, substantially non-frayed relationship with respect to each other, and a resin binder therefor, each of said upper and lower layers disposed in such a relationship that the interfacial portion is characterized by the frayed monofilaments of the middle layer penetrating the inner surfaces of the outer layers and interlocking with the strands thereof.

4. An integral felted fibrous mat having a weight of about 0.3 to about 6.0 ounces per square foot, the mat comprising:
   (1) a first layer portion comprising a plurality of chopped glass strands, said strands consisting of a multiplicity of monofilaments, which strands in said first layer portion have been frayed at their extremities into a number of their composite monofilaments, and a resin binder for said strands, and
   (2) a second layer portion of high strength glass fiber strands consisting of a multiplicity of monofilaments linearly disposed with respect to each other, in substantially non-frayed form compared to the strands of said first layer portion, a portion of said monofilaments of the frayed strands of said first layer portion projecting into the high strength, non-frayed strands of said second layer portion and interlacing therewith to form an interfacial, interlocking relationship therebetween.

5. An integral felted fibrous mat having a weight of about 3/10 to about 6.0 ounces per square foot, the mat comprising:
   (1) a first layer portion having a plurality of chopped highly glass strands, said strands consisting of a multiplicity of monofilaments, which strands in said first layer portion having been frayed at their extremities into a number of their composite monofilaments, and a resin binder for said strands,
   (2) a second layer portion comprising a plurality of high strength glass fiber strands consisting of a multiplicity of monofilaments in substantially non-frayed form with respect to the strands of said first layer portion, and a binder for said high strength strands and
   (3) a third layer portion having a plurality of chopped glass strands, said strands consisting of a multiplicity of monofilaments, which strands in said third layer portion have been frayed at their extremities into composite monofilaments, and a resin binder for said strands, said first and third layer portions being substantially similar and the strands thereof consisting of substantially an equal number of monofilaments.

References Cited by the Examiner

UNITED STATES PATENTS

| | | | |
|---|---|---|---|
| 1,503,605 | 8/1924 | Shaw | 161—155 |
| 2,055,410 | 9/1936 | Hurst et al. | 161—155 |
| 2,746,895 | 5/1956 | Duvall | 264—113 |
| 2,765,247 | 10/1956 | Graham | 161—155 |
| 2,860,687 | 11/1958 | Cole | 156—370 |
| 2,890,146 | 6/1959 | Unsworth | 264—113 |
| 3,017,918 | 1/1962 | Maillard | 156—370 |
| 3,061,496 | 10/1962 | Meyer | 161—151 |
| 3,081,207 | 3/1963 | Fox | 161—153 |

ALEXANDER WYMAN, *Primary Examiner.*

MORRIS SUSSMAN, EARL M. BERGERT, *Examiners.*